United States Patent [19]

Baker

[11] Patent Number: 5,452,124

[45] Date of Patent: Sep. 19, 1995

[54] UNIDIRECTIONAL AMPLIFICATION FOR BI-DIRECTIONAL TRANSMISSION USING WAVELENGTH-DIVISION MULTIPLEXING

[75] Inventor: Phillip E. Baker, Tulsa, Okla.

[73] Assignee: Williams Telecommunications Group, Inc., Tulsa, Okla.

[21] Appl. No.: 206,423

[22] Filed: Mar. 4, 1994

[51] Int. Cl.⁶ .............................................. H04B 9/00
[52] U.S. Cl. ................................. 359/341; 359/127; 359/634
[58] Field of Search ............... 359/114, 124, 127, 160, 359/341, 618, 629, 634

[56] References Cited

U.S. PATENT DOCUMENTS

| | | | |
|---|---|---|---|
| 4,849,043 | 2/1990 | Mochizuki et al. | 250/227 |
| 4,910,727 | 3/1990 | Fussgänger | 455/606 |
| 4,972,513 | 11/1990 | Mochizuki et al. | 455/601 |
| 5,058,103 | 10/1991 | Shimizu | 359/124 |
| 5,107,358 | 4/1992 | Hodgkinson et al. | 359/124 |
| 5,295,011 | 3/1994 | Heise | 359/114 |
| 5,375,010 | 12/1994 | Zervas et al. | 359/341 |

*Primary Examiner*—Mark Hellner
*Attorney, Agent, or Firm*—Arnold, White & Durkee

[57] ABSTRACT

A device in accordance with the invention uses a novel four-port wavelength-division multiplexing (WDM) filter and a single erbium-doped optical amplifier (EDFA) to implement a dual wavelength bi-directional (single fiber) optical amplifier module. A system using an amplifier module in accordance with the invention, advantageously allows communication network managers to simultaneously reduce the cost of signal amplification hardware across a fiber optic network, increase fiber utilization, simplify field installation and maintenance operations, and maintain adherence to conventional protection philosophies such as "one system per fiber."

7 Claims, 7 Drawing Sheets

UNIDIRECTIONAL AMPLIFICATION FOR BI-DIRECTIONAL TRANSMISSION USING WAVELENGTH-DIVISION MULTIPLEXING

BACKGROUND OF THE INVENTION

The invention relates to the amplification and transmission of signals through optical fibers. The invention makes use of novel four-port wavelength-division multiplexers and erbium-doped optical fiber amplifiers for bi-directional communications through a single optical fiber.

1.1 Conventional Two-Fiber Transmission

FIG. 1 depicts a conventional baseline two-fiber transmission link where blocks 101 and 102 can represent either regeneration or central office sites. Connecting the two sites together is a fiber optic cable. Within the cable there are multiple strands of fiber 103, of which two have been shown. In this type of transmission system, communication from a transmitter (TX) at site A to a receiver (RX) at site B utilizes one signal wavelength ($\lambda_1$) and one strand of an optical cable. Communication in the opposite direction uses a different strand of the optical cable and the same, or different, wavelength ($\lambda_2$) to carry the signal.

Referring again to FIG. 1, sites A and B (101 and 102) can represent different site configurations. In one configuration, one terminal site might communicate directly to another terminal site in a complete end-to-end, communication system. Alteratively, FIG. 1 could represent a single link in a longer chain of transmission stations. In other words, sites A and B might be representative of a site C and a site D and a site E and so on, until a final site containing terminating transmission equipment is reached.

Depending upon the wavelength chosen for transmission, the strand of optical fiber 103 used may exhibit different attenuation characteristics which may limit the possible sparing of regenerator sites, e.g., sites A and B. Attenuation in a typical single-mode optical fiber is about 0.35 dB/kilometer at 1310 nanometer (nm) and about 0.25 dB/kilometer at 1550 nm. Thus, for systems operating at data rates of a few gigabits per second, regenerator sites could be spaced anywhere from about 35 to 45 kilometers when operating at 1310 nm and into the 70 to 80 kilometer range when operating at 1510 nm.

1.2 Wavelength-Division Multiplexer (WDM) Filters

FIG. 2 depicts a conventional narrow-band wavelength-division multiplexing communication system. Here, the term "narrow-band" is used to mean that more than one wavelength is utilized within the same transmission "window" of the optical fiber. For example, if the depicted system is operating within the 1550 nm window, two signaling wavelengths of 1533 and 1557 nm might be used. For standard single mode fiber, the two main transmission "windows" of interest are 1310 nm and 1550 nm.

Unlike the configuration shown in FIG. 1, communication between site A and site B in FIG. 2 is provided by a single strand of optical fiber 103. Bi-directional transmission is achieved through the utilization of wavelength-division multiplexing (WDM) filters, 201 and 203. (The devices 201 and 203 can be the same or slightly different devices, depending upon the manufacturing technique used to create them.) The purpose of WDM filters is to couple multiple wavelengths into (hereafter referred to as 'on') and out of (hereafter referred to as 'off') the transmission fiber. In the example shown, WDM filters 201 and 203 couple the two wavelengths 1557 and 1533 nm on and off a single fiber 103 of a fiber optic cable.

1.2(a) WDM Technology

There are several technologies that can be used to construct WDM filters. For example, etalon technology, defraction grading technology, fused biconic taper technology, and holographic filter technology. One technology that has proven to be widely useful in the telecommunications industry is dichroic filter technology. This technology offers several advantages including wide channel passbands, flat channel passbands, high channel isolation, low insertion loss, low cost, high reliability and field ruggedness, high thermal stability, and moderate filter roll-off characteristics.

An illustrative example of a conventional three-port dichroic filter 300 is shown in FIG. 3. A dichroic filter is comprised of one or more layers of dielectric material coated onto a, for example, glass substrate 305 with lenses 310 to focus the incoming and outgoing optical signals. The choice of dielectric material, the number of dielectric layers coated onto the substrate, and the spacing of these layers are chosen to provide the appropriate transmissive and reflective properties for a given—target—wavelength. For example, if $\lambda_1$ is the target wavelength to be transmitted through the filter, the number and spacing of the dielectric layers on the substrate 305 would be chosen to provide (1) a specified passband tolerance around $\lambda_1$ and (2) the necessary isolation requirements for all other transmitted wavelengths, for example, a wavelength, $\lambda_2$, transmitted by a second transmiter.

The dichroic, or WDM, filter is constructed by placing self-focusing lenses, such as "SELFOC" lenses 310, on either side of the dielectric substrate 305. "SELFOC" lens 310 focuses incoming light ($\lambda_1$ and $\lambda_2$) to a particular location on the dielectric substrate. Attached to the "SELFOC" lenses through an adhesive bonding process are, typically, single-mode optical fibers. For convenience, the locations at which optical fibers attach to the "SELFOC" lenses 310 are called ports: port 1 320, port 2 325, and port 3 330. Connected to the ports are optical fibers 335, 340, and 345 respectively.

For example, all of the fight (comprised of $\lambda_1$ and $\lambda_2$) passing through fiber 335 connected to port 1 320 is focused by lens 310 to a single location on the dielectric substrate 305. Since the substrate is coated to pass wavelengths around $\lambda_1$, virtually all of the light at $\lambda_1$ passes through the dielectric substrate 305 and, via the second "SELFOC" lens, is collimated into port 3 330, and passes away from the filter on optical fiber 345. Any other wavelength incident on the filter through port 1 320 (e.g., light of wavelength $\lambda_2$) is reflected off the multilayer substrate, focused back through the first "SELFOC" lens to port 2 325, and passes away from the filter on optical fiber 340. Likewise, the filter performs the same function for light traveling in the opposite direction.

This technology could be used to, for instance, implement WDM filter 201 shown in FIG. 2. If site B 103 is setup to receive $\lambda_1$ and transmit $\lambda_2$, then Table 1 shows the mapping between the connections shown in FIG. 2 for WDM 201, and the labeling of the illustrative WDM shown in FIG. 3.

TABLE 1

| Example WDM Implementation | |
|---|---|
| WDM Filter 201 (FIG. 2) | WDM Filter 300 (FIG. 3) |
| Fiber 103 | Port 1 (320) |
| TX Output | Port 2 (325) |
| RX Input | Port 3 (330) |

The advantages of using WDM technology in the 1550 nm transmission window include: 1) WDM devices reduce, by half, the strands of fiber cable needed to establish a communication link, and 2) conventional optical fibers introduce less signal attenuation per unit length at these wavelengths, allowing longer distances between regenerator sites and thereby lowering the cost of building a network.

FIG. 4 is a variation of the system shown in FIG. 1, a two-fiber design where one wavelength ($\lambda_1$) is transmitted on one fiber in one direction, and another (or possibly the same) wavelength ($\lambda_2$) is transmitted on the other fiber in the opposite direction. Erbium-doped fiber amplifiers (EDFAs) can be deployed along such a link in multiple locations: immediately following the transmitter (TX), making them post-amplifiers; immediately preceding a receiver (RX), making them pre-amplifiers; or between a transmitter and receiver, as shown in FIG. 4, making them line-amplifiers. Commercially available EDFA devices only operate in the 1550 nm window. Typically, in the line-amplifier configuration, regenerator spacing can be almost doubled, from approximately 70 to 80 kilometers to approximately 140 to 160 kilometers. (This analysis assumes typical filter attenuation and that at 80 kilometers the system is attenuation limited and not dispersion limited for distances less than 160 kilometers). Hence, if the cost of two EDFAs is less than the cost of a conventional fiber optics transmission system regenerator, the two EDFAs 401 and 403 can be used to reduce equipment deployment costs when constructing a transmission network such as that shown in FIG. 4.

1.3 Erbium-Doped Fiber Amplifier (EDFA) Technology

FIG. 5 shows a conventional design for an EDFA such as that shown in FIG. 4, blocks 401 and 403. In a typical dual-pumped amplifier there are either two or three optical isolators 501, two WDM filters 505 and 511, two laser pump sources 503 and 509, and a length of erbium-doped single mode fiber 507. If the amplifier is single-pumped, one of the pump sources 503 or 509 is removed. If a pump source is removed, its corresponding WDM filter is likewise removed: if pump source 503 is removed, WDM filter 505 is also removed; if pump source 509 is removed, WDM filter 511 is also removed.

WDM filters perform the function of coupling the pump source laser wavelength into the erbium-doped fiber. Pump energy is used to elevate the erbium ions concentrated in the erbium-doped fiber to a higher-than-normal energy level. These ions will stay excited until they decay on their own accord or are stimulated to decay by the arrival of a signal wavelength photon arriving from the transmission link 103. It is through the process of "stimulated decay" that an optical signal is amplified in an EDFA.

Isolators function as one-way conduits for optical signals. In other words, isolator elements 501 allows an optical signal to pass in a single direction, e.g., from left to right, but not from fight to left.

Consider the case where a signal photon enters the amplifier of FIG. 5 at the point labeled IN. The photon passes through isolator 501 and enters the WDM filter 505, where it is routed into the length of erbium-doped fiber 507. Both during and preceding the arrival of the signal photon, laser pumps 503 and 509 have been providing energy to the erbium-doped fiber via the WDMs 505 and 511, exciting the fiber's erbium ions. Upon entering the erbium fiber, the signal photon will cause decay of some of the excited erbium ions, releasing their energy in the form of (stimulated) photons. The original signal photon plus the stimulated photons then pass out of the WDM 511, through the output isolator 501, and back onto the transmission fiber 103.

Several aspects of amplifier design and utilization are well-known to those of ordinary skill. Of great importance in network applications is the configuration of the optical amplifier. If optical isolators are used internal to the amplifier, then they make the amplifier an inherently unidirectional device. In FIG. 5 for example, the isolators 501 prevent a signal from propagating from right-to-left (OUT toward IN). These isolators are important for eliminating the amplification of unwanted back reflections which could degrade system stability. Another characteristic that must be considered when deploying an amplifier is what signal wavelength to use in conjunction with the amplifier's pump(s) wavelength. Because amplifier gain is not perfectly flat for all incoming wavelengths (different wavelengths exhibit different gain characteristics), the precise wavelengths to use are a function of the gain variations of the different available pump wavelengths.

1.4 EDFA Based Amplifier Systems

Two prior art communication links utilizing EDFAs and conventional WDMs are shown in FIGS. 6 and 7. In FIG. 6 a single-fiber transmission link is shown with one EDFA 401 configured as a line amplifier. As previously stated, if the EDFA 401 of FIG. 6 were a typical amplifier (built as described in FIG. 5 for example) this communication link would not provide bi-directional transmission; transmission would occur from site A to site B, but not from site B to site A. (it is possible to build an optical amplifier without the optical isolators but this creates inherent instability problems that make it difficult to maintain a safe operating environment and is, therefore, not recommended by existing industry standards).

In FIG. 7 EDFA amplifiers 401 and 403 are deployed as post-amplifiers, immediately following the transmitters (TX) and immediately before the WDM filters 201 and 203. It is possible to obtain bi-directional transmission over the single fiber link 103 in this configuration. There are, however, at least two disadvantages to this implementation. First, in this design the high power signal leaving a transmitter is physically collocated with an optical receiver (RX). In such cases, care must be taken to avoid near-end optical loop backs. In other words, at site A 101 with a high power signal leaving EDFA 401, any signal reflection from the WDM filter 203 could return to site A's receiver and cause an optical feedback problem. The same is true of site B's configuration. Another drawback to this configuration is in the economics of deploying post amplifiers versus line amplifiers. (Line amplifiers provide a larger gain margin than do post amplifiers). If line amplifiers could be used to extend the distance between sites, while maintaining the ability to provide bi-directional transmission, the cost of the system's hardware could be significantly reduced.

Conventional unidirectional amplifier systems (e.g., FIG. 4) use two fibers per link; one fiber carrying data in one direction and the other fiber carrying data in the opposite direction. If two signal channels are needed in such a system, four fibers are required. Likewise, conventional bi-directional amplifier systems (e.g., FIG. 2) use one fiber per link. If two signal channels are needed in such a system, two fibers are required. The reduction in fiber count of a bi-directional WDM design could also be achieved in a unidirectional WDM design by employing multiple transmitters on a single fiber in one direction and multiple transmitters on a single fiber in the opposite direction. An example of the latter system design, using two transmitters and two receivers at each site, is depicted in FIG. 8. In this design, transmitter one ($TX_1$) and transmitter two ($TX_2$), located at site A 801 and operating at wavelength 1 and wavelength 2 respectively, are coupled onto a single fiber 103 through the WDM filter 203. Both of these wavelengths are amplified by the EDFA 401 during signal transmission. WDM filter 201, located before the two receivers $RX_1$ and $RX_2$, is used to separate the two wavelengths and route each signal to the correct receiver.

The design of FIG. 8 could be built using conventional EDFAs, including internal isolators, because only unidirectional transmission through the amplifiers are required. The primary disadvantage of this design lies in the difficulty of protecting such a system. With multiple systems on a single fiber, if that fiber is lost due to a cable cut or some other disaster, then multiple systems would be down at the same time. By convention, transmission systems employ a 1-by-N protection scheme, meaning that one backup system is used to protect multiple (N) transmission channels. If a single channel fails, that channel's traffic is rerouted to the backup channel and no traffic is lost. The failed channel is said to have been "switched to protect." In a 1-by-N scheme if multiple systems (transmitters or receivers) fail, only one system can switch to protect. In order to protect the configuration shown in FIG. 8 beyond a 1-by-1 system, multiple protect systems would be required, since there are multiple systems on a single fiber. This is a costly endeavor and one which the invention addresses.

1.4(a) Illustrative Systems

FIG. 9 depicts one configuration for a dual wavelength, bi-directional narrow-band WDM optical amplifier module, 901. Components used to construct the amplifier module 901 include: two WDMs, 201 and 203 (input and output ports of the amplifier module), and two EDFAs, 903 and 905, which can be either single-pumped or dual-pumped depending upon the communication system's power constraints/requirements. This line-amplifier configuration extends the regenerator spacing while providing bi-directional transmission utilizing a single-fiber strand of the cable facility 103.

It should be noted that the amplifier module 901 can be cascaded to extend even farther the distance between site A and site B. (The number of amplifiers that can be cascaded, between sites A and B, is limited by the dispersion characteristics of the transmission equipment deployed at sites A and B.)

FIG. 10 depicts one embodiment of a bi-directional amplifier module design that can be constructed utilizing a single EDFA. In this configuration, bi-directional transmission over a single optical fiber is achieved using four WDM filters. All signal wavelengths must pass unidirectionally through the EDFA 401 due to the constraint of using optical isolators in the EDFA 401 (refer to FIG. 5). Therefore, the two transmission wavelengths traveling in opposite directions, must be broken apart and recombined through WDM filters to pass unidirectionally through the EDFA. Similarly, the two amplified wavelengths must be broken apart and recombined through WDM filters to continue propagating toward their respective receiver sites. WDM filter 203 is constructed to bandpass 1557 nm and WDM filter 201 is constructed to bandpass 1553 nm.

Assuming a typical 1550 nm EDFA operational band, then going through FIG. 10 in a left-to-right direction we see a 1557 nm signal is transmitted from site A 101, through the east WDM filter 203, and onto the fiber cable 103. As the signal enters the amplifier module it is separated by the west WDM filter 201. (Each WDM filter in FIG. 10 has its external connection points labeled either 33 or 57. Connections labeled 33 carry optical signals at the 1533 nm wavelength. Connections labeled 57 carry optical signals at the 1557 nm wavelength.) The signal then travels to the east WDM filter 203 where it is routed into the EDFA amplifier 401. Upon leaving the EDFA, the 1557 nm signal is routed by another west WDM filter 201 to the amplifier module's output east WDM filter 203 where it is placed onto the fiber optic transmission cable 103. Finally, the signal leaves the transmission cable 103, enters the west WDM filter 201 at site B 102, and is routed to that site's receiver equipment. Signals transmitted from site B, at 1533 ran, take a different path through the WDM filters 201 and 203 and EDFA 401 on their way to site A's receiver.

An advantage of this embodiment over the configuration described in FIG. 9 is that only a single erbium-doped fiber amplifier is required. Because multiple wavelengths are being amplified by a single amplifier, it is sometimes preferable that the EDFA 401 in FIG. 10 use a dual-pumped amplifier rather than a single-pumped amplifier. The additional gain provided by a dual-pumped EDFA could compensate for the signal strength lost by virtue of passing it through a number of additional elements.

To enhance the economic viability of bi-directional amplification, a means of implementing an amplifier module such as that shown in FIGS. 9 and 10 with a reduced component count and increased reliability is needed.

SUMMARY OF THE INVENTION

A device in accordance with the invention uses a novel four-port dichroic (wavelength-division multiplexing, WDM) filter and a single erbium-doped optical amplifier (EDFA) to implement a dual wavelength bi-directional (single fiber) optical amplifier module. A system using an amplifier module in accordance with the invention, advantageously allows communication network managers to simultaneously reduce the cost of signal amplification hardware across a fiber optic network, increase fiber utilization, simplify field installation and maintenance operations, and maintain adherence to conventional protection philosophies such as "one system per fiber."

DETAILED DESCRIPTION OF A SPECIFIC EMBODIMENT

One illustrative embodiment of the invention is described below as it might be implemented using dichroic (wavelength-division multiplexer, WDM) and EDFA technology. In the interest of clarity, not all features of an actual implementation are described in this specification. It will of course be appreciated that in the development of any such actual implementation (as in any hardware development project), numerous implementation-specific decisions must be made to achieve the developers' specific goals and subgoals, such as compliance with system-and business-related constraints, which will vary from one implementation to another. Moreover, it will be appreciated that such a development effort might be complex and time-consuming, but would nevertheless be a routine undertaking of device engineering for those of ordinary skill having the benefit of this disclosure.

4.1 Introduction

Figure 1:
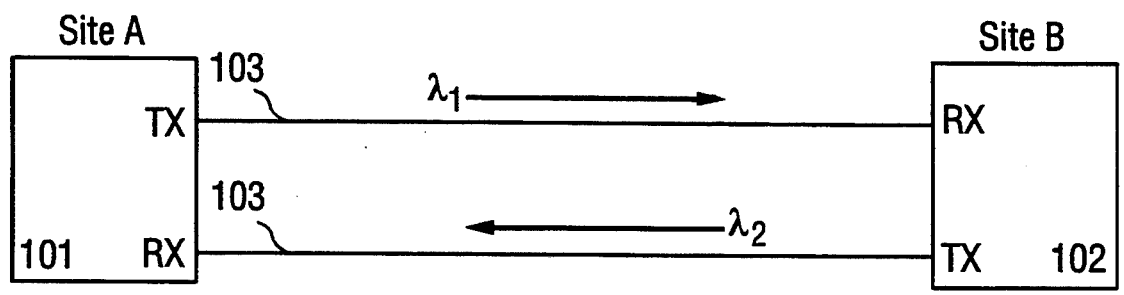
FIGS. 1, 2 and 4 through 8 are block-diagram representations of some conventional fiber optic communication systems as discussed in more detail above.
Figure 2:
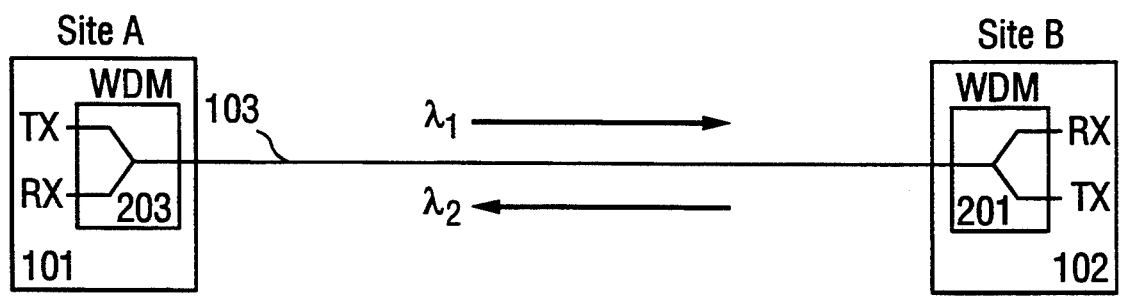
Figure 3:
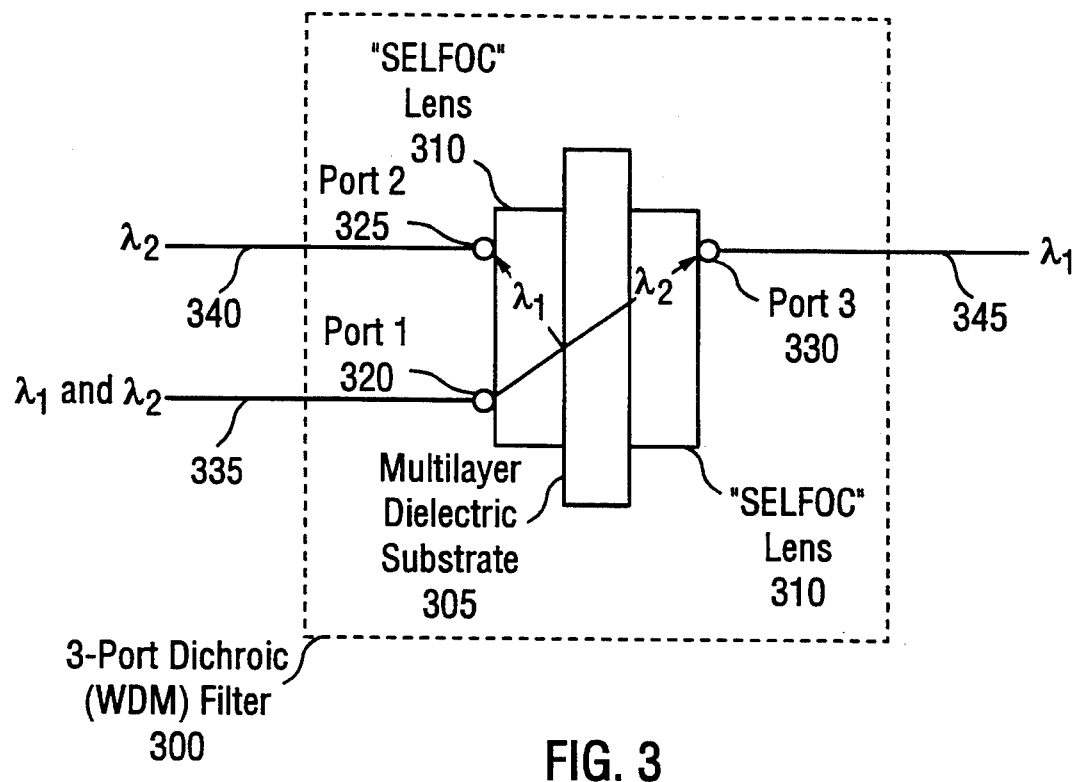
FIG. 3 is a block diagram representation of a conventional three-port wavelength-division multiplexer filter.
Figure 4:
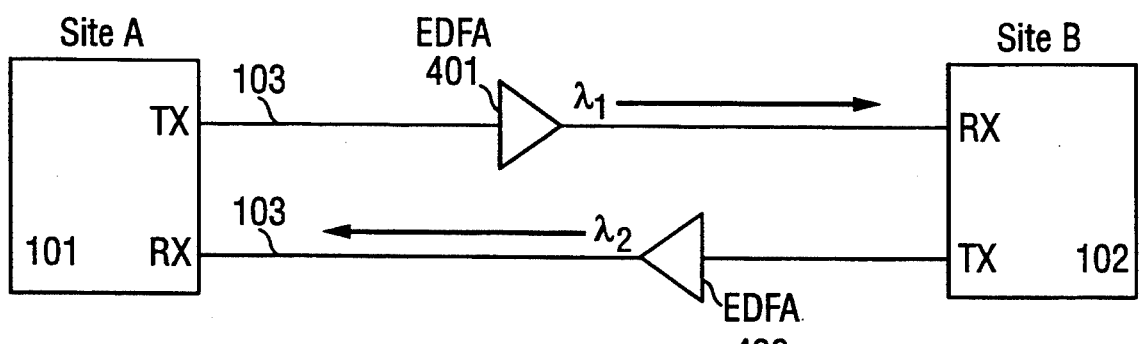
Figure 5:
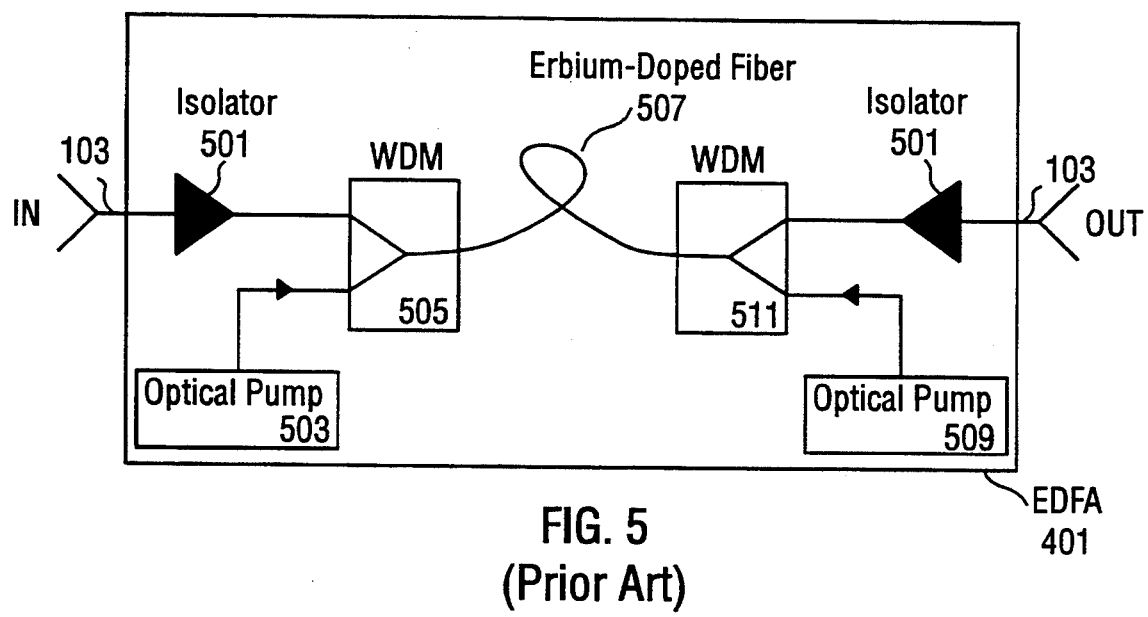
Figure 6:
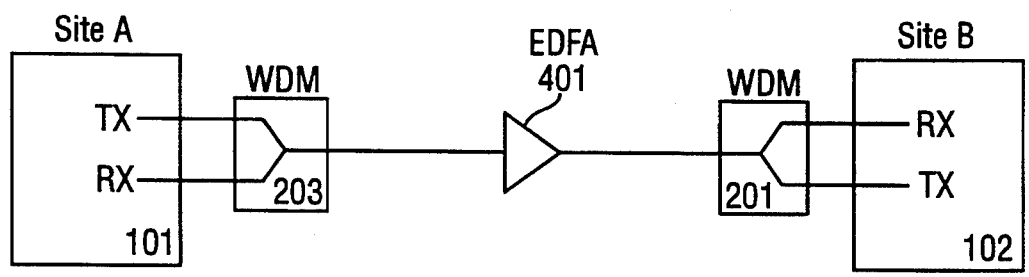
Figure 7:
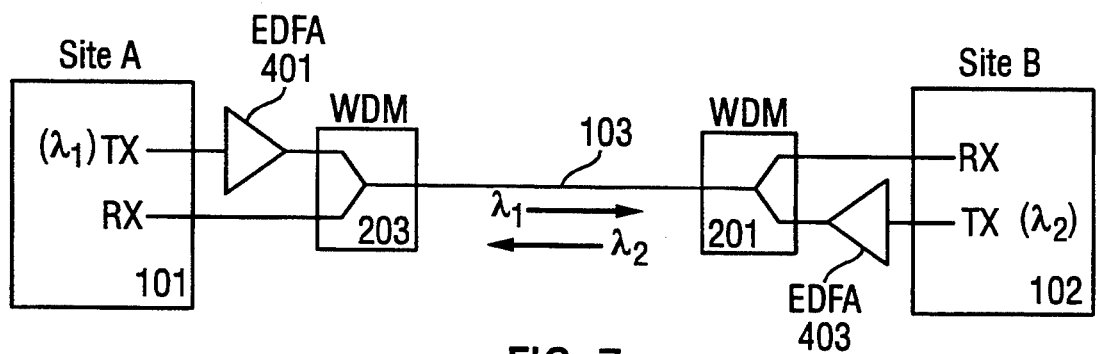
Figure 8:
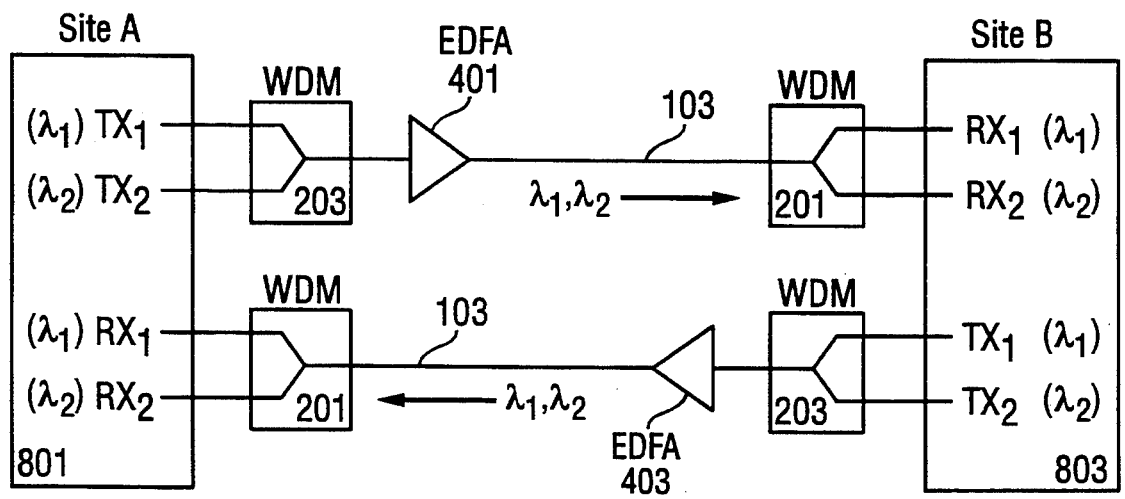
Figure 9:
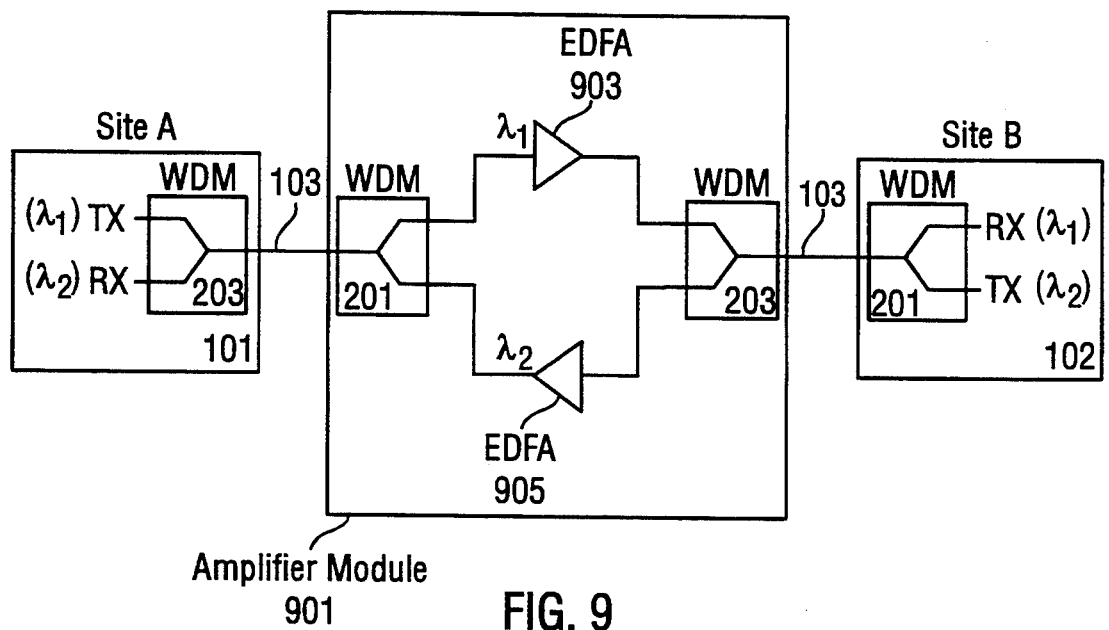
FIG. 9 is a block diagram representation of a single-module amplifier for bi-directional transmission employing wavelength-division multiplexing and erbium-doped fiber amplifier technology.

As previously noted, bi-directional amplification is important in adhering to the protection philosophy of a single fiber failure only resulting in outage to a single transmission system. Given this constraint, there are two basic ways to provide bi-directional amplification. One method, shown in FIG. 9, utilizes two separate EDFA sources—one EDFA to amplify one signal in one direction and the other EDFA to amplify another signal in the opposite direction. Another embodiment, shown in FIG. 10, has the advantage of using only a single amplifier, but requires four WDM filters in order to route the different (signal) wavelengths so that they pass uni-directionally through the single amplifier. (Recall that an EDFA is inherently a unidirectional device due to the isolators incorporated within it to eliminate the amplification of unwanted back reflections which, in turn, could produce instability.)

4.2 Detailed Description of Amplifier Module

An optical line amplifier module in accordance with the current invention provides bi-directional signal transmission using a single EDFA and a single four-port WDM. A significant and novel feature of the present invention is its use of a four-port WDM filter. The filter technology required to implement the invention's four-port device is the same as that used in prior art embodiments utilizing three-port WDM filters—dichroic technology.

Figure 11:
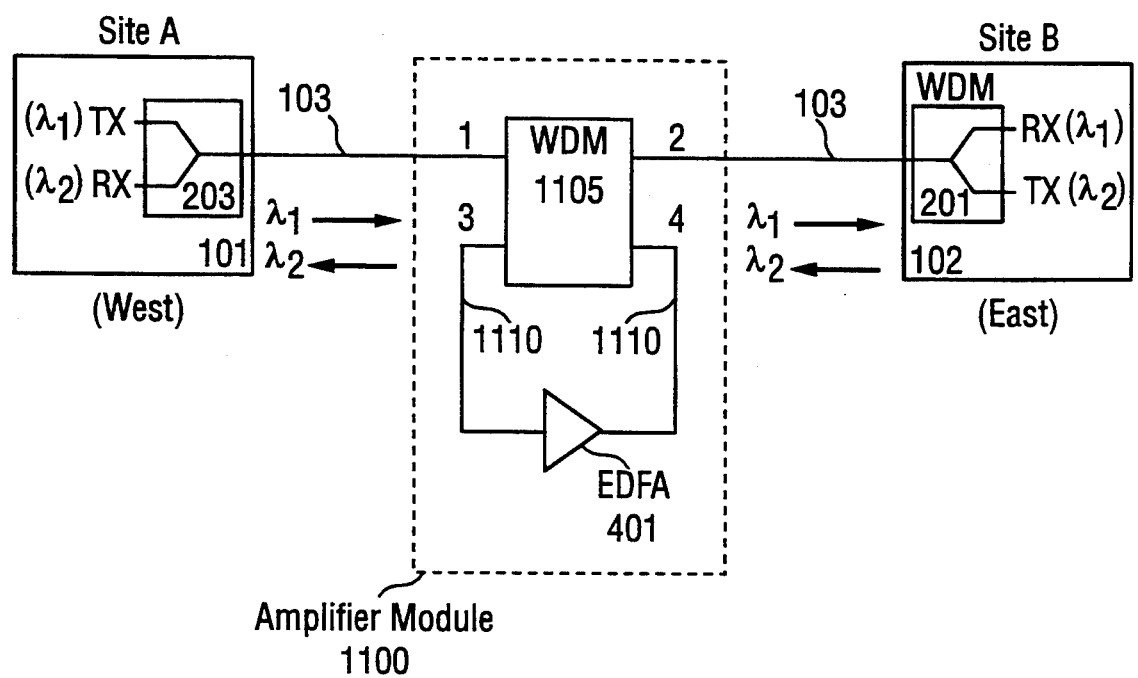
FIG. 11 is a block diagram representation of a system in accordance with the invention, a bi-directional amplifier module comprising a single four-port wavelength-division multiplexer filter and a single erbium-doped fiber amplifier.

FIG. 11 depicts a system incorporating a single fiber bi-directional amplifier module 1100 in accordance with the invention. At site A, a WDM 203 is used to combine two wavelengths of light ($\lambda_1$ and $\lambda_2$) onto a single fiber 103. The transmitter at site A is transmitting light at wavelength $\lambda_1$. The receiver at site A is receiving light from site B at wavelength $\lambda_2$. Hence, $\lambda_1$ travels from site A to site B or from west to east on fiber 103, and $\lambda_2$ travels from site B to site A in an east to west direction on the fiber 103.

Incorporated within the amplifier module 1100 is a four-port WDM filter 1105. As shown in FIG. 11, port 1 connects to the west fiber link 103, port 2 connects to the east fiber link 103, port 3 is connected to the input of the amplifier module's EDFA via an optical fiber link 1110, and port 4 is connected to the output of the amplifier module's EDFA via an optical fiber link 1110. Site A's 101 WDM filter 203 is a dichroic filter designed to pass a center wavelength $\lambda_2$. Site B's 102 WDM filter 201 is also a dichroic filter, but is designed to pass a center wavelength $\lambda_1$. The amplifier module's WDM filter 1105 can be constructed from either WDM filter 201 or 203 with the addition of an extra port. The functionality of the invention's four-port WDM will be described below.

Figure 12:
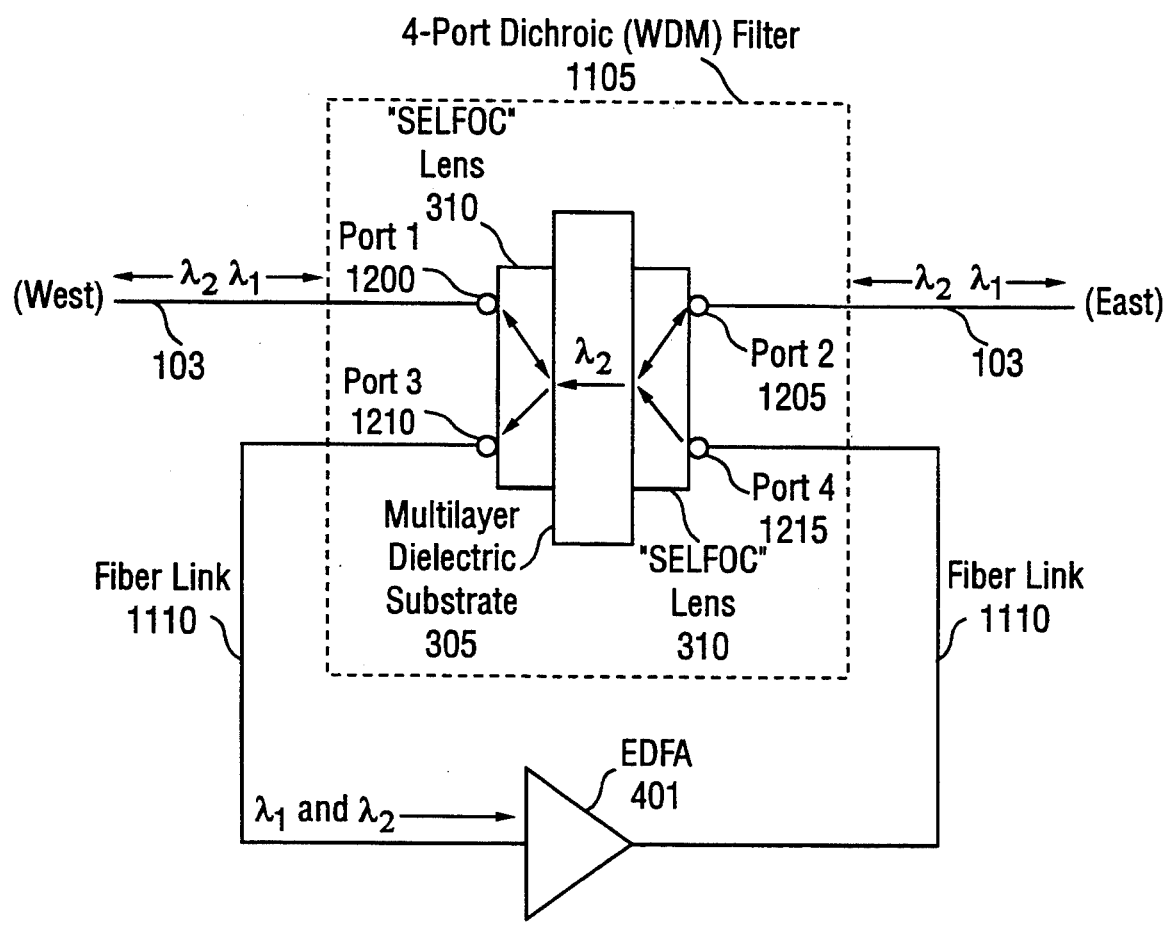
FIG. 12 is an expanded block diagram of the bi-directional communication system of FIG. 11.

FIG. 12 depicts a four-port WDM filter 1105 in accordance with the invention. West fiber link 103, coming from site A, is connected to port 1 1200. East fiber link 103, coming from site B, is connected to port 2 1205. In this example, let WDM filter 1100 (i.e., the multilayer dichroic substrate 305) have a designed pass—center—wavelength of $\lambda_2$. This means that signals having a wavelength $\lambda_2$ will pass through the WDM filter (i.e., the multilayer dielectric substrate) while signals of all other wavelengths will be reflected.

Light traveling into port 1 1200 on "west" fiber 103 having wavelength $\lambda_1$ will, after being focused onto the filter's substrate by "west" lens 310, be reflected back to port 3 1210 through west lens 310 (recall, only light having a wavelength of $\lambda_2$ will pass through the filter's substrate). In a similar manner, light traveling into port 2 1205 on "east" fiber 103 having wavelength $\lambda_2$ will, after being focused onto the filter's substrate by "east" lens 310, be passed through the filter's substrate material 305, recollimated by "west" lens 310, and collected at port 3 1210. Hence, port 3 1210 collects light having both wavelengths $\lambda_1$ and $\lambda_2$. As shown, light leaving port 3 1210 is routed via fiber link 1110 to the input port of a conventional EDFA 401. (Fiber links 1110 can be conventional single-mode optical fiber.) In this manner light traveling from site A to site B as well as light traveling in the opposite direction, from site B to site A, is passed uni-directionally through the EDFA 401.

After amplification, both wavelengths $\lambda_1$ and $\lambda_2$ exit the amplifier 401 and are routed to port 4 1215 where they are focused by the "east" lens 310 onto the filter's substrate 305. Light of wavelength $\lambda_1$ is reflected back through the "east" lens into port 2 1205 where it exits the filter on its way to site B. Light of wavelength $\lambda_2$ is passed through the substrate and focused by the "west" lens 310 into port 1 1200 where it exits the filter on its way to site A.

The four-port WDM provides a means to correctly route bi-directional incoming signals so that they pass uni-directionally through a single amplifier, and then are routed into their correct directions for continued transmission.

Suggested component specifications for a transmission system, like that illustrated in FIG. 11, designed to operate in the 1550 nanometer window are given in Table 2.

TABLE 2

| | | Suggested Component Specifications |
|---|---|---|
| Block | Item | Specification |
| 1105 | Four-Port WDM | Dichroic filter Technology. Passband: 1557 ± 3 nm Insertion loss: <1.5 dB Isolation: >35 dB Back reflecfion: <−40 dB Polarization stability: <0.2 dB |
| 103, 1110 | Optical Fiber | Single-mode fiber such as Corning SMF-28 glass or equivalent. |
| 201 | Three-Port WDM | Dichroic filter Technology. Passband: 1553 ± 3 nm Insertion loss: <1.5 dB Isolation: >35 dB Back reflection: <−40 dB Polarization stability: <0.2 dB |
| 203 | Three-Port WDM | Same as block 201 with a passband of 1557 ± 3 nm. |
| 401 | EDFA (single pump version) | Operating range: 1530 – 1565 nm Noise figure: <6 dB Saturated output power: >12 dB Small signal gain: >25 dB Polarization stability: <0.3 dB MTBF: >140,000 hours |

4.3 Advantages of the Invention

Figure 10:
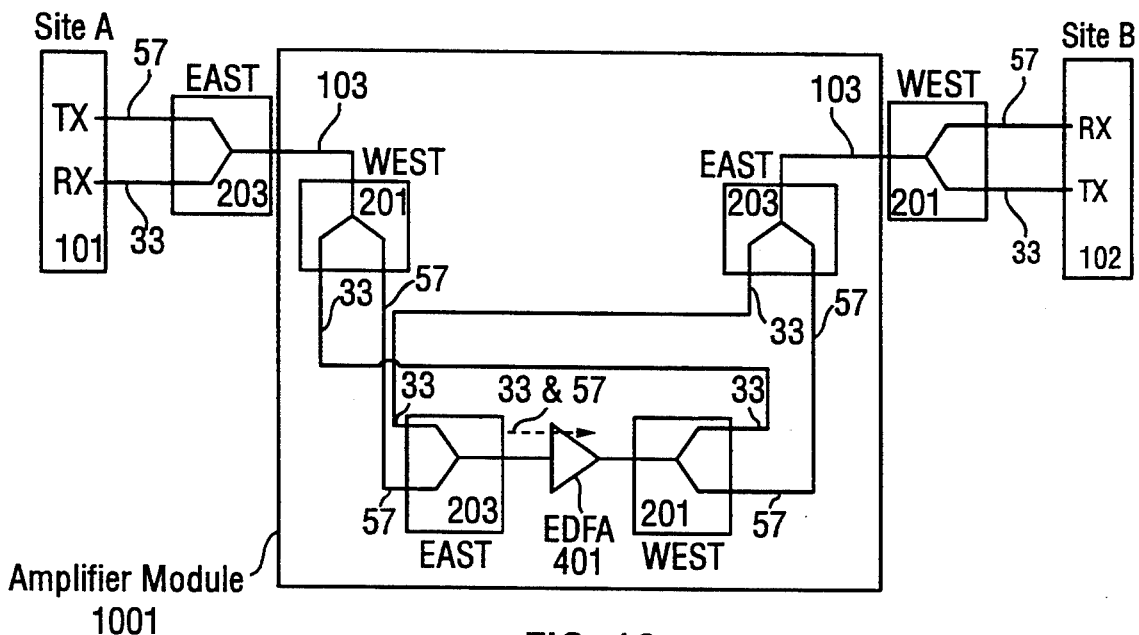
FIG. 10 is a block diagram representation of a bi-directional optical amplifier module comprising a single erbium-doped fiber amplifier and four conventional three-port wavelength-division multiplexers.

Both the four three-port WDM configuration of FIG. 10 and the single four-port WDM configuration of FIGS. 11 and 12 provide the significant advantage of allowing bi-directional transmission through a single amplifier. Bi-directional transmission is important in maintaining a single fiber failure transmission philosophy in that, if there is a single fiber failure due to natural failure or human error, only one transmission system will be in jeopardy and will be protected by a conventional 1-by-N protection scheme.

There are however, several additional advantages provided by the four-port WDM device of the invention. One of the more significant advantages is the cost savings in going from four devices to a single device—i.e., from a system like that shown in FIG. 10 to that of FIG. 11. Additional advantages include: (1) a reduction in the size of packaging that could be obtained when using a single WDM, (2) the improved reliability of a single WDM amplifier module over one with four WDMs, (3) and the reduction in interconnections afforded by the four-port WDM amplifier module. This latter feature impacts both the manufacturing and maintenance costs of an optical transmission system employing amplifier modules. The insertion loss of the current invention is improved since the light traveling in either direction encounters the insertion loss of the same filter twice as compared to the insertion loss of four conventional filters in the previous design. Isolation loss of the invention does not degrade since the single filter used offers the same isolation as the cascaded design of four filters.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

What is claimed is:

1. An optical line amplifier module comprising a single dichroic filter having four ports wherein:

(a) a specified first port is connected to a first optical transmission fiber;

(b) a specified second port is connected to a second optical transmission fiber;

(c) a specified third port is connected to the input port of at least one optical amplifier; and (d) a specified fourth port is connected to the output port of said at least one optical amplifier.

2. An optical line amplifier module of claim 1 wherein the optical amplifier is an erbium-doped fiber optic amplifier.

3. An optical amplifier module comprising one dichroic filter having four ports and at least one uni-directional amplifier, said amplifier module configured to amplify both an east light path and a west light path uni-directionally through the at least one unidirectional optical amplifier.

4. The optical amplifier module of claim 3, wherein said at least one uni-directional optical amplifier is an erbium-doped fiber amplifier.

5. A method of transmitting a first optical signal, having a first wavelength, that is propagating in a first direction in a optical fiber in which a second optical signal, having a second wavelength, is propagating in a second direction, comprising the steps of:

(a) routing said first and second optical signals to the input port of an optical amplifier through a router;

(b) amplifying said first and second optical signals;

(c) rerouting said first optical signal in said first direction through said router; and (d) rerouting said second optical signal in said second direction through said router.

6. The method of claim 5, wherein said router is a single dichroic filter having four ports.

7. The method of claim 5, wherein said optical amplifier is an erbium-doped optical amplifier.

* * * * *